United States Patent
Cetinkaya et al.

(10) Patent No.: US 12,449,819 B2
(45) Date of Patent: Oct. 21, 2025

(54) RELATIVE POSITION DETERMINATION METHOD FOR MULTIPLE UNMANNED AERIAL, MARINE AND LAND VEHICLES

(71) Applicants: ASELSAN ELEKTRONIK SANAYI VE TICARET ANONIM SIRKETI, Ankara (TR); GEBZE TEKNIK UNIVERSITESI, Kocaeli (TR)

(72) Inventors: Guven Cetinkaya, Ankara (TR); Yakup Genc, Kocaeli (TR)

(73) Assignee: ASELSAN ELEKTRONIK SANAYI VE TICARET ANONIM SIRKETI, Kocaeli (TR)

( * ) Notice: Subject to any disclaimer, the term of this patent is extended or adjusted under 35 U.S.C. 154(b) by 83 days.

(21) Appl. No.: 18/626,493

(22) Filed: Apr. 4, 2024

(65) Prior Publication Data

US 2024/0338031 A1    Oct. 10, 2024

(30) Foreign Application Priority Data

Apr. 4, 2023   (TR) ................ 2023/003707

(51) Int. Cl.

| | |
|---|---|
| *G05D 1/24* | (2024.01) |
| *G05D 1/686* | (2024.01) |
| *G06T 7/20* | (2017.01) |
| *G06T 7/73* | (2017.01) |
| *G06V 10/82* | (2022.01) |
| *G06V 20/56* | (2022.01) |
| *G05D 101/15* | (2024.01) |
| *G05D 111/10* | (2024.01) |

(52) U.S. Cl.
CPC ............... *G05D 1/24* (2024.01); *G05D 1/686* (2024.01); *G06T 7/20* (2013.01); *G06T 7/73* (2017.01); *G06V 10/82* (2022.01); *G06V 20/56* (2022.01); *G05D 2101/15* (2024.01); *G05D 2111/10* (2024.01); *G06T 2207/20081* (2013.01); *G06T 2207/20084* (2013.01); *G06T 2207/30252* (2013.01); *G06V 2201/08* (2022.01)

(58) Field of Classification Search
CPC ...... G05D 1/24; G05D 1/686; G05D 2101/15; G05D 2111/10; G05D 2109/254; G05D 1/243; G05D 1/695; G06T 7/20; G06T 7/73; G06T 2207/20081; G06T 2207/20084; G06T 2207/30252; G06V 10/82; G06V 20/56; G06V 2201/08
USPC ......................................................... 701/28
See application file for complete search history.

(56) References Cited

U.S. PATENT DOCUMENTS

2020/0380305 A1* 12/2020 Sharma ................ G06V 20/56

FOREIGN PATENT DOCUMENTS

| CN | 111462329 | * 7/2020 |
|---|---|---|
| CN | 113762409 | * 12/2021 |
| CN | 110443279 | * 8/2022 |

* cited by examiner

*Primary Examiner* — Muhammad Shafi
(74) *Attorney, Agent, or Firm* — Bayramoglu Law Offices LLC

(57) ABSTRACT

A camera-based and direct observation based relative position determination method for multiple unmanned aerial, naval and ground vehicles is provided. The method calculates the relative position between the relevant vehicles in multiple UAV, UNV and UGV systems.

1 Claim, 6 Drawing Sheets

RELATIVE POSITION DETERMINATION METHOD FOR MULTIPLE UNMANNED AERIAL, MARINE AND LAND VEHICLES

CROSS REFERENCE TO RELATED APPLICATIONS

This application is based upon and claims priority to Turkish Patent Application 2023/003707 filed on Apr. 4, 2023 the entire contents of which are incorporated herein by reference.

TECHNICAL FIELD

The invention relates to a camera-based and direct observation based relative pose estimation method for multiple unmanned aerial, naval and land vehicles, which is developed to calculate the relative pose (rotation and translation) between the relevant vehicles in multiple UAV (unmanned aerial vehicle), UNV (unmanned naval vehicle) and UGV (unmanned ground vehicle) systems.

BACKGROUND

When multi-robot systems are used together, in order to fulfil a given task, it is necessary to know the position of each robot as well as the relative positions between the group members. When they cannot do this, they cannot navigate together and accomplish a common task. In order to navigate together in the same environment and perform a common task, the location and map data of each robot system must be converted into a common coordinate system. Relative positions between group members are used in the conversion to a common coordinate axis.

In the prior art, collaborative visual positioning and mapping methods (SLAM-Simultaneous Localization and Mapping) on multi-robot systems can be evaluated in two different classes according to the methods used in the relative pose transformation calculation between robots. In the first class of methods based on direct observations, the robot systems calculate the relative pose transformation between each other by seeing each other directly. For example, in the method called JORB-SLAM [1], relative pose transformation is performed using visual markers called "April-Tag" placed on the robots. Similarly, in a different study [2], a visual marker containing ring-shaped signs is used. In this way, the visual marker placed on the robot is not very suitable for small-sized UAVs as it will add extra weight and require preparation. Additionally, since the visibility of visual markers will be limited, these methods do not work when there are long distances between air vehicles. In addition, the UAV, which appears as a single point (the 2D pointer also appears as a single point from afar), limits a single degree of freedom with these methods and cannot predict the other 5 degrees of freedom. In another study [3], relative pose conversion is calculated by placing ultraviolet wavelength LEDs (light-emitting diode) and filtered cameras configured to see only this wavelength on UAVs. By switching the LEDs on and off at different speeds, the identification (differentiation) of the air vehicles is also provided. In more innovative methods [4, 5], detection and relative pose estimation of UAVs are carried out using artificial intelligence methods without using visual pointers. Such methods need to be trained with large amounts of data to work in different weather and light conditions. In the second class of methods [6-8], which are based on indirect observations, relative pose estimation is made with the information obtained from the areas commonly observed by the robots. In such methods, robots localize on their own while traveling in the field and constantly share information with each other about the areas they observe. Each robot can calculate the relative pose transformation between its own observation and the information of the other robot when it realizes that there is information from other robots in the area it is currently observing with place recognition algorithms. All position and map information produced in this way can be converted into a common reference system. In this class of methods, it is necessary to ensure that each robot observes a common area. In addition, detecting that robots are in the same area is a problem that is very error-prone. Robots traveling in very different areas may think that they are in the same region when they receive very similar images and produce very erroneous information (perceptual aliasing). The majority of studies in the literature on methods in this class have concentrated on eliminating such errors. For example, in the study numbered [7], the effect of the perceptual aliasing problem that occurs during the movement of two UAVs on the football field on the result is shown and the improvement provided by the proposed method is shown.

The problems identified in the prior art can be listed as follows:
 Placing visual markers on UAVs creates extra weight and requires extra preparation, so it is not considered suitable for small-sized UAVs.
 Since the visibility of visual markers will be limited, the relevant methods do not work when there are long distances between air vehicles. In addition, the UAV, which appears as a single point (the 2D pointer also appears as a single point from afar), limits a single degree of freedom with these methods and cannot predict the other 5 degrees of freedom.
 Placing active markers on UAVs creates a disadvantage in terms of power consumption and shortens the already limited flight time. It is also very difficult to distinguish active markers (LEDs) from each other at long distances.
 In deep learning-based methods, there are decreases in performance depending on distance. In addition, only distance estimation can usually be made with the relevant methods.
 In methods based on indirect observation, UAVs should have taken images from the same regions, even if at different times. If this condition is not met, the relative pose transformation between UAVs cannot be calculated.
 Due to perceptual aliasing in indirect observation-based methods, when UAVs observe different regions that are very similar to each other, it may be thought that they are in the same location. This causes very large errors in the positioning results.

In WO2019/067695 the observer/hunter UAV detects any target UAV with image processing and artificial intelligence and steers towards that target. The aim of the method is to detect the target UAV, calculate its 3D position and destroy the same by approaching the target and throwing a net. In the method of relative position determination for multiple unmanned aerial, naval and ground vehicles, it is emphasized that cooperative UAVs calculate the 6-DOF pose transformation between each other by applying a pre-studied movement pattern at certain moments while performing missions together, and then continue their missions. One of the UAVs draws a pre-studied shape in the air (there is no such movement in WO2019/067695), while the other UAV calculates the relative pose transformation between the two UAVs from the on-camera image of this shape using a deep learning model. It is seen that the issues highlighted in the relative position determination method for multiple unmanned aerial, naval and ground vehicles are not included in WO2019/067695. In WO2019/067695, the relative position can be calculated from a single image in which the target UAV can be detected. In the relative position determination method for multiple unmanned aerial, naval and ground vehicles, the target UAV is detected and tracked on consecutive images while performing a defined movement, and the position can only be calculated after a certain period of time or after the movement is completed. In summary, the relative position calculation algorithms used in both methods work in different logic. In WO2019/067695, remote targets are first detected by a Ground Control Station (GCS), the location of the target is transmitted to the hunter/observer UAV, the observer approaches towards that location, and after a certain distance to the target, the relative position determination method runs on itself. The accuracy of distance and position estimation from a single image will be very low as the target UAV will appear as a very small dot on the image when it is very far away. In the proposed relative position determination method for multiple unmanned aerial, naval and land vehicles, it is sufficient to detect the target UAV as a single point in sequential images in order to calculate the relative position. Therefore, unlike the proposed method in the WO2019/067695, it is possible to produce solutions at very long distances without the need for external information (such as GCS, etc.).

As a result, due to the abovementioned disadvantages and the insufficiency of the current solutions regarding the subject matter, a development is required to be made in the relevant technical field.

SUMMARY

The invention aims to solve the abovementioned disadvantages by being inspired from the current conditions.

The main purpose of the invention is to calculate the relative position between UAVs in multiple UAV systems. The proposed method can also be utilized on multiple UNV and UGV systems as well.

In order to fulfil the above-mentioned objectives, the invention is a camera-based and direct observation based relative position determination method for multiple unmanned aerial vehicles developed for calculating the relative position between UAVs in multiple UAV systems, a preferred embodiment of the present invention comprises the following process steps:
  a. target unmanned aerial ($UAV_T$)/ground/naval vehicle performing a predefined movement in different relative poses,
  b. data collection by recording the trajectory on the image plane corresponding to the observer unmanned aerial ($UAV_O$)/ground/naval vehicle while the target unmanned aerial ($UAV_T$)/ground/naval vehicle is performing the predefined movement at different relative poses (this enable recording of trajectory and ground truth data for many different relative pose values),
  c. realization of deep learning model training using the collected data,
  d. target (collaborator/friend) unmanned aerial ($UAV_T$)/ground/naval vehicle starting to perform a predefined movement,
  e. taking the image of an observer unmanned aerial ($UAV_O$)/ground/naval vehicle by means of an image capture unit and checking whether there is a target unmanned aerial ($UAV_T$)/ground/naval vehicle on the image taken,
  f. in case the target unmanned aerial ($UAV_T$)/ground/naval vehicle is detected in the received image, determining the bounding box information,
  g. in case the target unmanned aerial ($UAV_T$)/ground/naval vehicle is not detected in the received image, returning to step e,
  h. tracking the target using image tracking algorithms using bounding box information,
  i. extracting features between consecutive points using bounding box information, preferably taking into account the relationships between the position of the Centre point of the bounding box in the current and previous images, and
  j. calculating the 6-DOF relative position between the observer unmanned aerial ($UAV_O$)/ground/naval vehicle and the target aerial ($UAV_T$)/ground/naval vehicle by providing the extracted features as input to a deep learning model.

In a further preferred embodiment, the bounding box information is corner point, width and height information.

The structural and characteristic features of the present invention will be understood clearly by the following drawings and the detailed description made with reference to these drawings and therefore the evaluation shall be made by taking these figures and the detailed description into consideration.

DETAILED DESCRIPTION OF THE EMBODIMENTS

Figure 1:
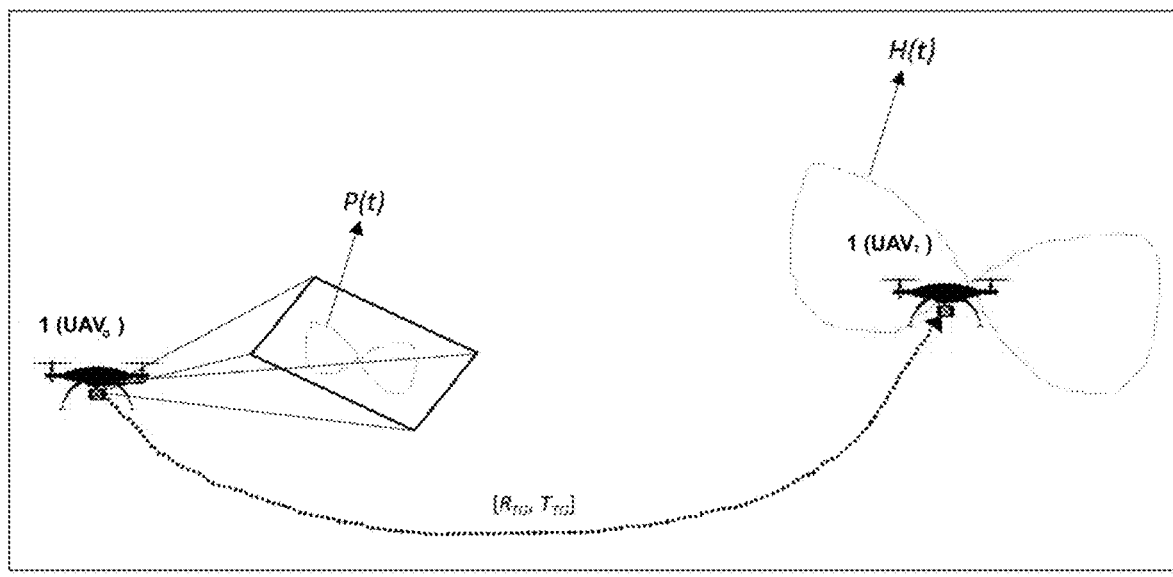
FIG. 1 is a representative view of the multi-UAV movement geometry of the invention.

The reference characters used in the FIGS. are as follows:
  1: unmanned aerial vehicle (UAV).
  2: Overlapping eight trajectories (OET).
  3: Discriminative, rotated second eight trajectories (SET).

In this detailed description, the preferred embodiments of the inventive relative positioning method for multiple unmanned aerial vehicles are described by means of examples only for clarifying the subject matter.

An image-based method is being developed to calculate the relative positions between multiple unmanned aerial, marine and ground vehicles so that they can operate together in the same environment. The developed method is used for the solution of the relative pose transformation between vehicles in the collaborative visual simultaneous localization and mapping problem in multiple UAV, UNV and UGV systems.

In a multi-UAV system, UAVs are divided into two groups as observer UAVs ($UAV_O$) and target UAVs ($UAV_T$) in the relative position calculation method between UAVs. The target UAV (UAV$_T$) makes a predefined movement (e.g. drawing a eight-shaped trajectory), while the observer UAV (UAV$_O$) watches it through a camera on itself. In the case where the motion (H(t)) of the UAV$_T$ is known (see Equation 1), certain parameters of the relative position between the UAV$_T$ and the UAV$_O$ can be calculated (see FIG. 1).

$$H(t) = \begin{bmatrix} R_0 & T_0 \\ 0 & 1 \end{bmatrix} \begin{bmatrix} R(t) & T(t) \\ 0 & 1 \end{bmatrix} + \in_0(t) \quad \text{(Equation-1)}$$

Figure 2A:
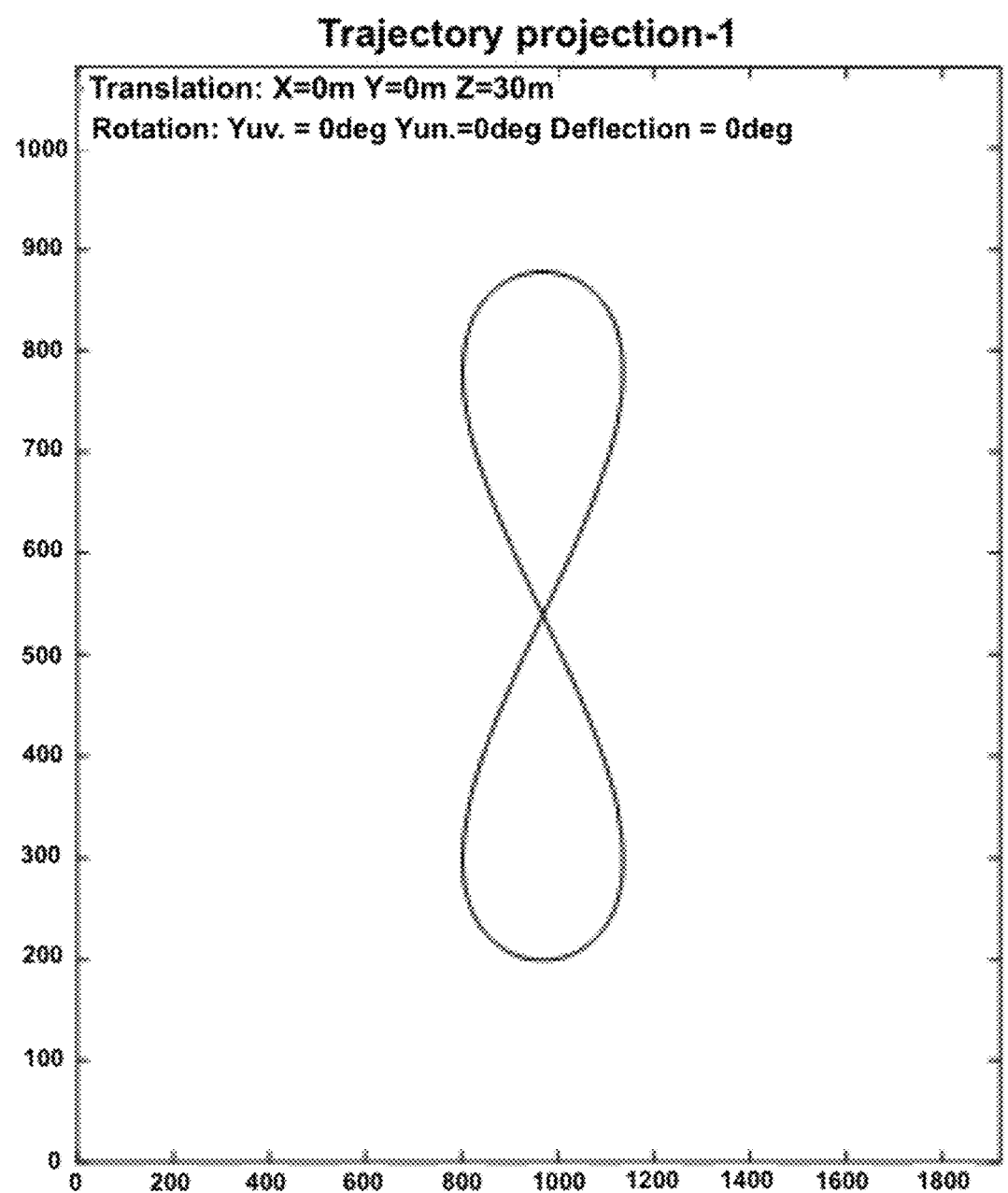
FIGS. 2A-2B are representative views of the image of the $UAV_T$'s trajectory on the $UAV_O$'s camera for two different relative positions of the invention.
Figure 2B:
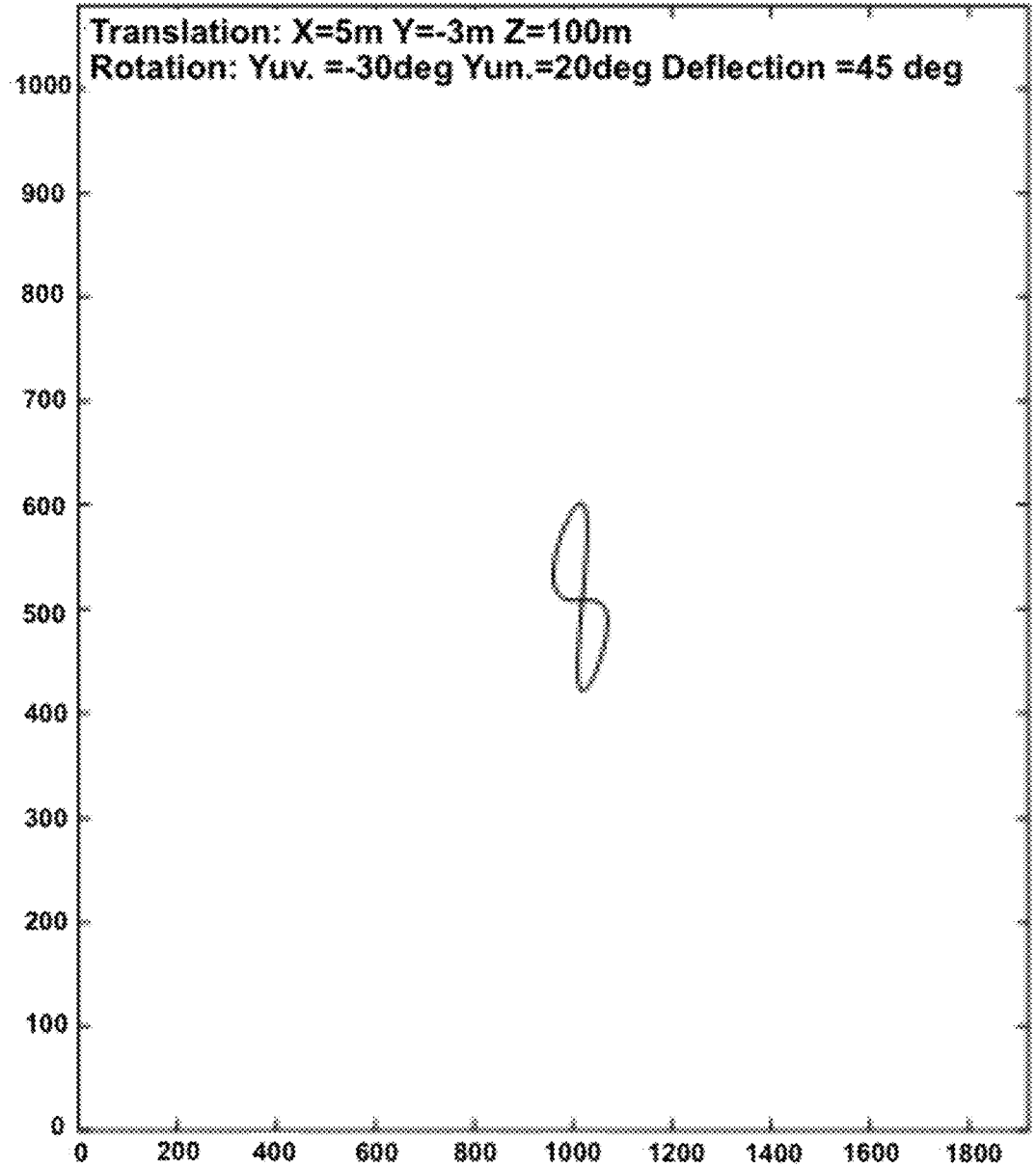

In the simplest case, where the UAV$_O$ is stationary (suspended) at a certain position in the air and visually tracks the movement of the UAV$_T$, assuming that the distance between the UAVs is large, the UAV$_O$ tracks the movement of the UAV$_T$ as a point on the beam connecting the instantaneous position of the UAV$_T$ and the camera center of the UAV$_O$. The trajectory (P(t)) on the camera plane is formed as the projection of the motion (H(t)) of the UAV$_T$ in three dimensions. This projection depends on the camera calibration matrix (K), the relative position between the UAVs ([R$_{TG}$, T$_{TG}$]) and the motion (H(t)) of the UAV$_T$ in three dimensions as specified in Equation 2. For example, at different ([R$_{TG}$, T$_{TG}$]) values, when the UAV$_T$ draws octagonal trajectories of the same size, the projections of these trajectories on the camera will be different (see FIGS. 2A-2B). The backfolding of the relative position between the UAVs ([R$_{TG}$, T$_{TG}$]) is in principle obtained by inversion of this trajectory into three-dimensional space (see Equation 3).

$$P(t) = \pi(K, R_{TC}, T_{TG}, H(t)) \quad \text{(Equation-2)}$$

$$R_{TC}, T_{TG} = f(P(t)) \quad \text{(Equation-3)}$$

The movement of the UAV$_T$ is locally known to the extent that it can accommodate an error ($\in_0$), which depends on its own positioning system. For example, if UAV$_T$ uses the Visual Simultaneous Localization and Mapping (Visual SLAM) method as a positioning system, $\in_0$ is in a structure that changes and accumulates over time. Ideally, the translation function from the trajectory in the image plane to the three-dimensional plane, defined in Equation 3, is realized analytically. However, the characteristics of $\in_0$ may make it analytically impossible to perform this conversion. The proposed method is based on the realization of this cycle with a data-driven method.

In the training phase, both UAV$_T$ and UAV$_O$ use GNSS as the positioning system, so that the ground truth value of the relative position between both UAVs is known. While the UAV$_T$ performs its predefined motion (H(t)), the UAV$_O$ records the trajectory (P(t)) on the image plane corresponding to this motion. With the data collected in this way, a deep learning model is trained to estimate the conversion function f(P(t)) (see Equation-3) between each H(t) and P(t).

The training phase is carried out in the following three sub-stages:

1. Data collecting: At this stage, the UAV$_T$ performs its predefined motion (H(t)) at different relative poses, while the UAV$_O$ records the trajectory (P(t)) on the image plane corresponding to this motion. In this way, both trajectory data and ground truth data are recorded for many different relative pose values.
2. Offline Deep Learning Model Training: Using the data collected in Stage 1, the training of the deep learning model used in the relative pose estimation method for multiple unmanned aerial, naval and ground vehicles is carried out. At this stage, the trained model is used as the base model for all configurations (different platforms, different cameras, etc.).
3. Online Deep Learning Model Training: In this phase, data is collected in an environment known with the UAV and camera configuration to be used in the mission, and the model parameters trained in Stage 2 are updated again in a way specific to the current configuration. The amount of data collected at this stage may be less than the amount of data collected at Stage 1.

In the proposed method, no parametric calibration such as camera calibration etc. is required beforehand. During a training flight in the test area, aircraft perform certain predefined movements and collect data to learn the configuration between themselves. Using this data, a deep learning model is trained to generate 6 degrees of freedom position information between the air vehicles. Air vehicles then perform their missions using this model. Thus, the proposed method is generalizable for different types of unmanned aerial vehicles and different flight configurations.

Figure 3:
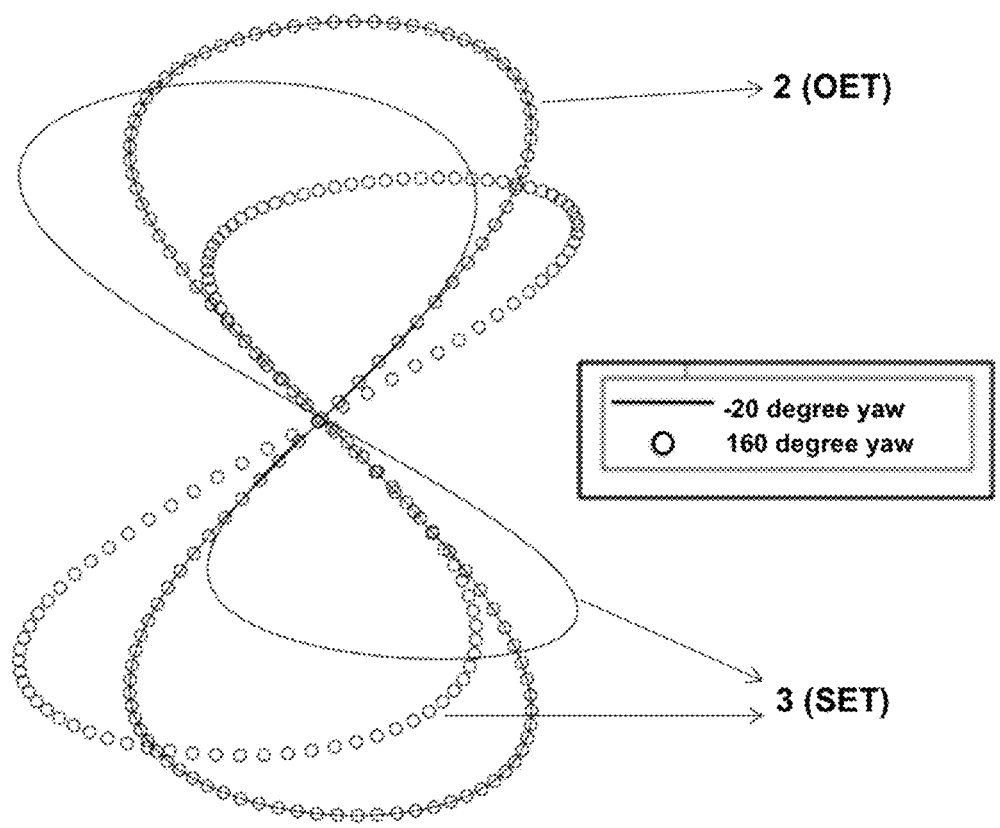
FIG. 3 is a representative view of solving (preventing) uncertain situations (such as ambiguities) of the invention with a special trajectory.

The predefined movement (trajectory) to be performed by the UAV$_T$ can be configured in such a way that it can be easily distinguished at any distance and angle on the camera of the UAV$_O$ and can be any trajectory (size, geometry, etc.). In some cases, at two different relative positions ([R$_{TG}$, T$_{TG}$]) between the UAVs, the projection of the trajectory drawn by the UAV$_T$ on the UAV$_O$'s camera may be the same. The predefined movement (trajectory) to be performed by the UAV$_T$ is selected in a structure that eliminates such ambiguity. For example, when eight shaped trajectory is considered, the projection of the eight shapes drawn on the UAV$_O$'s camera by the UAV$_T$ at two different yaw angles would be the same. To prevent this situation, drawing another rotated eight shape after the first eight shape can eliminate this uncertainty. (see FIG. 3).

Figure 4:
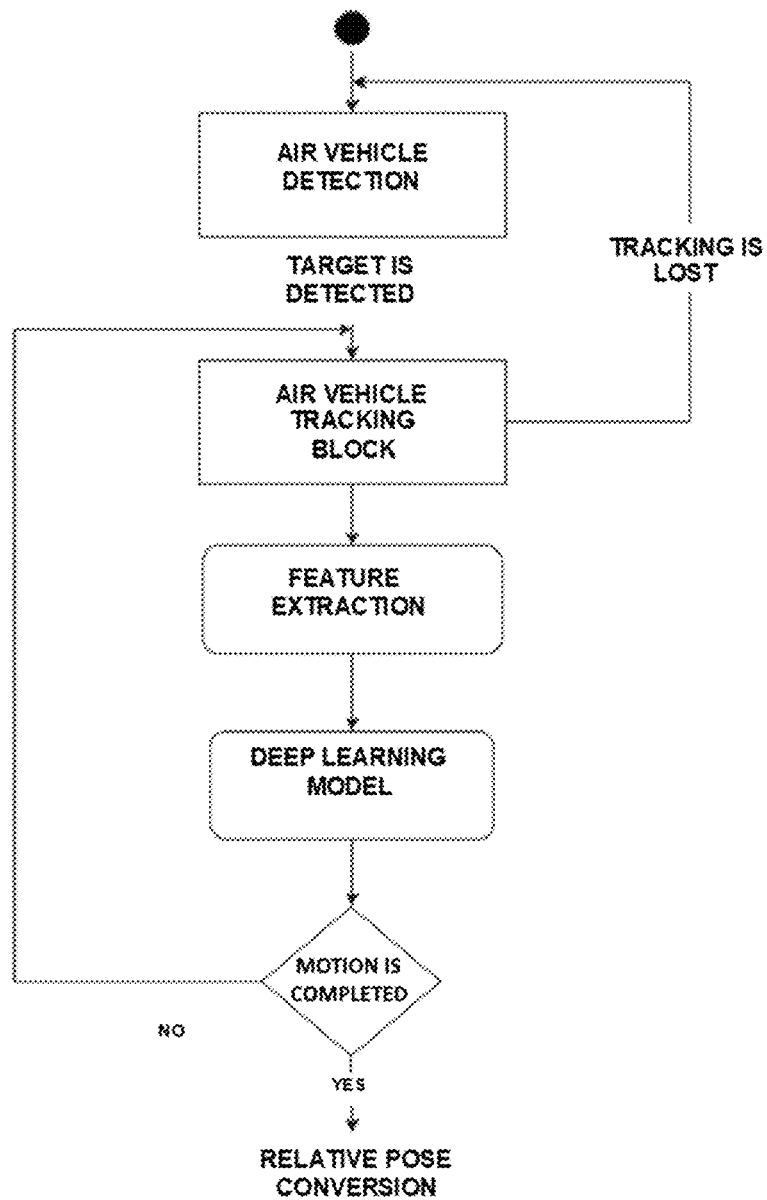
FIG. 4 is a representative view of the observer UAV ($UAV_O$) relative pose calculation flowchart of the invention.

In the relative pose determination method, the flowchart of the relative pose calculation algorithm, which uses the previously trained deep learning model that will run on the UAV$_O$ while the UAV$_T$ performs its defined movement during the mission, is shown in FIG. 4. Accordingly, UAV$_O$ performs the relative pose calculation by performing the following steps respectively.

Figure 5:
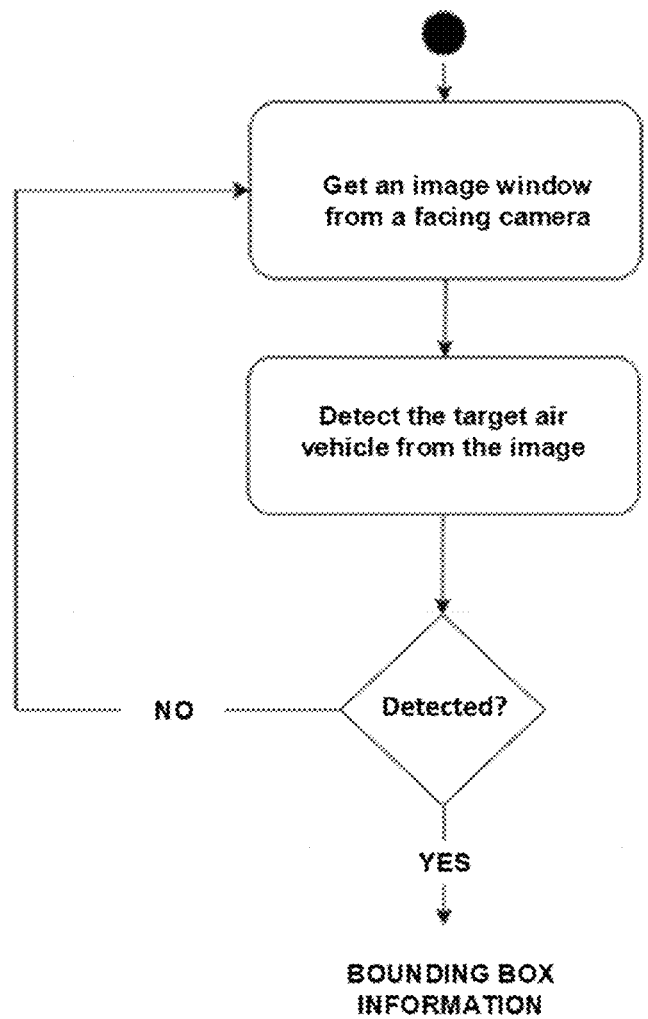
FIG. 5 is a representative view of the flow chart of the observer UAV ($UAV_O$) air vehicle detection block of the invention.

1. The flow chart of the Air Vehicle Detection Block is shown in FIG. 5. Accordingly, an image frame is taken from the front-facing camera and UAV$_T$ is tried to be detected within this frame. This step continues to be carried out until the UAV$_T$ is detected; in case the UAV$_T$ is detected, Step 2 (Air Vehicle Tracking) is started and Bounding Box information is provided. Bounding Box information includes the positions of the corner points and the center of the rectangle surrounding the detected aircraft in the image in image coordinates. In an alternative embodiment of the invention, said bounding box information is the corner point, width and length. By using the bounding box information, the target is tracked on the image using tracking method algorithms. The mentioned tracking methods are mean shift or deep sort etc. algorithms.
2. The Air Vehicle Tracking Block utilizes the bounding box information received from the Air Vehicle Detection Block to track the UAV on the image. It continues tracking by updating the bounding box information until the tracking is lost. If the tracking is lost, it is returned to step 1 (Air Vehicle Detection Block). The bounding box information maintained as a result of the tracking of the $UAV_T$ is forwarded to the Feature Extraction step.

3. In the feature extraction process, the bounding box information of the $UAV_T$ is used to extract the features to be provided to the deep learning block. When extracting the features, the relationships (Spline, Bézier Curve, etc.) between the position of the Centre point of the bounding box in the current and previous images (consecutive points) are taken into account. According to the deep learning method applied in the step 4, an end-to-end model can also be created by taking the feature extraction step into the deep learning block.

4. In the proposed method, a deep learning model based on sequential data is used to calculate the relative pose transformation between aircraft by taking the extracted attributes as input. This model calculates the relative pose transformation between the UAVs by taking the projection (P(t)) of the motion of the $UAV_T$ on the image plane sequentially. In addition, it is also able to detect which of the predefined movement patterns the $UAV_T$ performs and the start/end moments of the movement. As soon as the movement is complete (or as soon as the relative pose can be estimated), the result produced is usable. This deep learning model may consist of a convolutional neural network (CNN) layer and a LSTM layer, respectively.

The proposed method can be used in two different ways depending on whether there is communication between $UAV_O$ and $UAV_T$. In case there is communication between the UAVs, the $UAV_T$ can share the type and starting/finishing times of the movement with the $UAV_O$. In addition, thanks to the data to be shared by the UAVs with each other, the detection of $UAV_T$ in the Air Vehicle Detection Block is facilitated. In the case of communication, the difficulty of the problem and the complexity of the method are somewhat reduced. However, it is considered important that the method can also work in cases where the communication system does not work due to jamming etc. in the environment. In the absence of communication between the UAVs, the observer UAV also detects the type of pattern performed by the target UAV and the start/end of the movement. In this case, the complexity of the problem and the method to be used is higher.

In the proposed method, the $UAV_T$ performs a predefined movement (H(t)) at certain times. This movement can be performed periodically at a certain frequency or in case of a specific need (for example, when the positioning accuracy of aircraft falls below a certain value).

In the proposed method, all air vehicles used during the mission have the same configuration (same processor and sensor units). Thus, all air vehicles can fulfil the role of both $UAV_O$ and $UAV_T$. In this way, it is considered that the proposed method can be used in any type of UAV team/swarm with two or more members.

REFERENCES

[1] Kaustav Chakraborty, Martin Deegan, Purva Kulkarni, Christine Searle and Yuanxin Zhong, "JORB-SLAM: A Jointly optimized Multi-Robot Visual SLAM," 2020.
[2] T. Krajnik, M. Nitsche, J. Faigl, P. Vanek, M. Saska, "A practical multirobot localization sysem," Journal of Intelligent & Robotic Systems, vol. 76, no. 3-4, pp. 539-562, 2014.
[3] Viktor Walter, Nicolas Staub, Antonio Franchi, Martin Saska, "UVDAR System for Visual Relative Localization with application to Leader-Follower Formations of Multirotor UAVs," IEEE Robotics and Automation Letters, vol. 4, no. 3, pp. 2637-2644, 2019.
[4] Matous Vrba, Martin Saska, "Marker-Less Micro Aerial Vehicle Detection and Localization Using Convolutional Neural Networks," IEEE ROBOTICS AND AUTOMATION LETTERS, vol. 5, no. 2, pp. 2459-2466, 2020
[5] Roberto Opromolla, Giancarmine Fasano and Domenico Accardo, "A Vision-Based Approach to UAV Detection and Tracking in Cooperative Applications," Sensors (Switzerland), vol. 18, no. 10, p. 3391, 2018.
[6] Patrik Schmuck and Margarita Chli, "Multi-UAV Collaborative Monocular SLAM," in IEEE International Conference on Robotics and Automation (ICRA), Singapore, 2017.
[7] Pierre-Yves Lajoie, Benjamin Ramtoula, Yun Chang, Luca Carlone, Giovanni Beltrame, "DOOR-SLAM: Distributed, Online, and Outlier Resilient SLAM for Robotic Teams," IEEE Robotics and Automation Letters, vol. 5, no. 2, pp. 1656-1663, 2020.
[8] Hui Zhang, Xieyuanli Chen, Huimin Lu and Junhao Xiao, "Distributed and Collaborative Monocular Simultaneous Localization and Mapping for Multi-robot System in Large-scale Environments," International Journal of Advanced Robotic Systems, vol. 15, no. 3, pp. 1-20, 2018.

What is claimed is:

1. A relative position determination method performed by a processor for multiple unmanned aerial vehicles based on a camera and direct observation in multiple unmanned aerial vehicle systems and the method comprising the steps of:
 a. performing a predefined movement in different relative poses by target unmanned aerial vehicle ($UAV_T$) vehicle;
 b. collecting data by the observer unmanned aerial vehicle ($UAV_O$) by recording the trajectory on the image plane corresponding to the observer unmanned aerial vehicle ($UAV_O$) performing the predefined movement of the target unmanned aerial vehicle ($UAV_T$) at different relative poses to enable recording of trajectory and actual data for many different relative pose values, by watching target unmanned aerial vehicle ($UAV_T$) through the camera on itself;
 c. performing deep learning model training using the collected data, by the observer unmanned aerial vehicle ($UAV_O$);
 d. performing a predefined movement of target (collaborator/friend) unmanned aerial ($UAV_T$);
 e. taking the image of an observer unmanned aerial vehicle ($UAV_O$) by means of an image capture unit and checking whether there is a target unmanned aerial vehicle on the image taken;
 f. determining the bounding box information which is corner point, width and height information, by the observer unmanned aerial vehicle ($UAV_O$) if the target unmanned aerial vehicle ($UAV_T$) is detected in the received image;
 g. returning to step e if the target unmanned aerial vehicle ($UAV_T$) is not detected in the received image;
 h. tracking the target using image tracking algorithms using bounding box information, by the observer unmanned aerial vehicle ($UAV_O$);
 i. extracting features, by the observer unmanned aerial vehicle ($UAV_O$), between consecutive points using bounding box information, preferably taking into account the relationships between the position of the center point of the bounding box in the current and previous images;

j. calculating the 6-DOF relative position between the observer aerial vehicle ($UAV_O$) and the target aerial vehicle ($UAV_T$) by providing the extracted features as input to a deep learning model, by the observer unmanned aerial vehicle ($UAV_O$); and k. detecting the relative position between the observer aerial vehicle ($UAV_O$) and the target aerial vehicle ($UAV_T$).

* * * * *